UNITED STATES PATENT OFFICE.

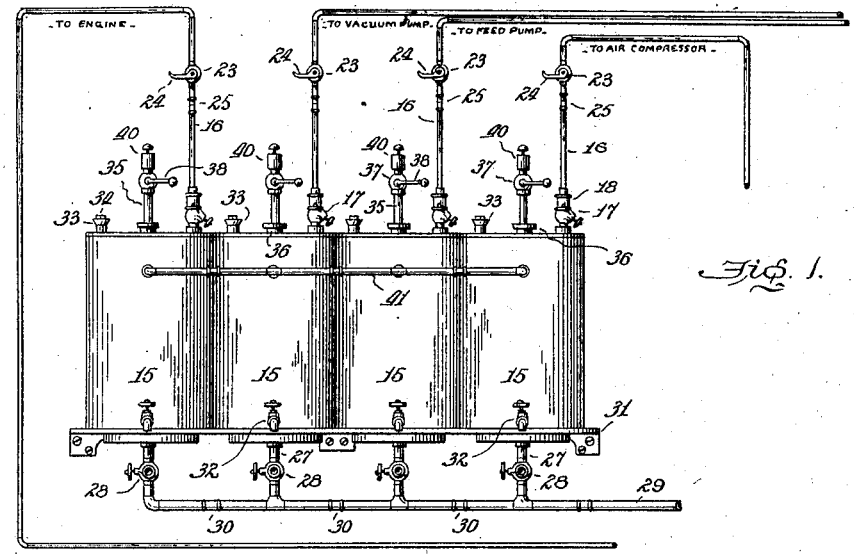
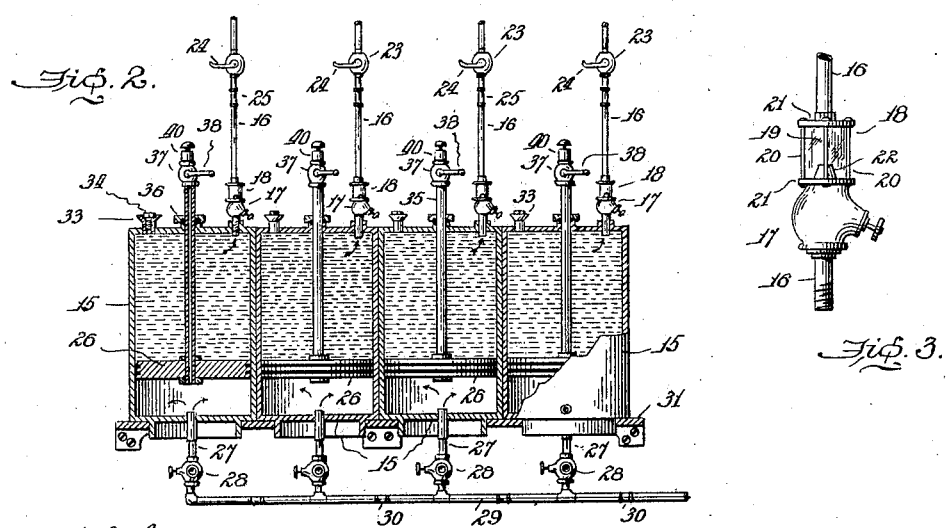
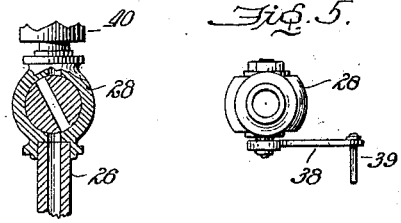

CHARLES CALHOUN, OF DUQUESNE, PENNSYLVANIA, ASSIGNOR OF ONE-HALF TO ARTHUR G. MEEKS, OF DUQUESNE, PENNSYLVANIA.

LUBRICATING DEVICE.

1,395,174. Specification of Letters Patent. Patented Oct. 25, 1921.

Application filed January 20, 1921. Serial No. 438,701.

*To all whom it may concern:*

Be it known that I, CHARLES CALHOUN, of Duquesne, Pennsylvania, citizen of the United States, have invented certain new and useful Improvements in Lubricating Devices, of which the following is a specification.

My invention is an improvement in lubricating devices of that particular type in which the oil for lubricating the bearing parts is contained in bulk in a tank or reservoir and fed from the latter under pressure to the machine, engine, or other mechanism to be lubricated.

The primary object of my invention is to provide a force-feed lubricating device which will not only facilitate the flowing of the oil to the parts or bearings but will also automatically sound a warning when the oil supply tank or reservoir is practically empty, and will also automatically cut off the oil supply or feed pipe to prevent back pressure therein during the operation of replenishing the oil in said reservoir.

In accomplishing the purposes of my invention I employ in connection with the tank or reservoir containing a supply of lubricating oil certain mechanical devices the construction, arrangement, and operation of which is fully described in the following specification; and what I claim as new and desire to protect by Letters-Patent is more specifically set forth in the appended claims.

In the accompanying drawings:—

Figure 1 is a front elevation of a lubricating device constructed in accordance with my invention.

Fig. 2 is a similar view, with the oil supply tanks or reservoirs shown in section.

Fig. 3 is a detail view, enlarged, of the needle-valve and sight feed device used in the oil feed connections.

Figs. 4 and 5 are detail views of the valve and operating means therefor at the upper end of the piston-rod.

Like numerals of reference indicate like parts in the several views of the drawings.

In carrying out my invention I employ several tanks or reservoirs 15, each containing a supply of oil for lubricating the bearing parts of an engine or machine, and therefore the number of oil supply tanks or reservoirs employed will depend upon the number of machines or bearing parts to be lubricated. In the present instance I have shown four tanks or reservoirs and have designated them as being connected to an engine, a vacuum pump, feed pump, and air-compressor, respectively, the connection in each instance being by means of a pipe 16 extending from the tank or reservoir through the top thereof and provided adjacent thereto with a conventional form of needle-valve 17 having an ordinary form of sight-feed device, the latter comprising a glass 19 connected by bolts 20 to end plates 21 with the usual discharge-nozzle 22 extending from the valve into the glass cage. At a suitable distance above the needle-valve and sight-feed device 18 there is a cut-off valve 23 in the pipe 16, said cut-off valve having a handle 24 disposed horizontally when the valve is open and located to coöperate with a movable part of the lubricating device to automatically close the valve, as and for the purpose hereinafter explained. The oil supply or feed pipe 16 is also provided with an expansion joint, 25, preferably interposed therein between the sight-feed device 18 and cut-off valve 23.

The oil in the tank or reservoir 15 is forced upward in the present instance to and through the feed pipe, and to accomplish this the oil is contained in said reservoir above a piston 26 working therein; the reservoir being preferably cylindrical in shape and the piston fitting snugly therein with the usual packings to prevent the oil from escaping by the same to the lower end of the cylinder, and to force the oil into the feed-pipes 16 fluid pressure, as steam, is introduced into said cylinder below the piston by way of a pipe 27 having a cut-off 28, the several pipes which discharge the steam into the respective reservoirs or cylinders being connected to a steam-supply pipe 29 with interposed unions 30 for convenience in disconnecting one or more of said reservoirs. The cylindrical reservoirs are supported in any suitable manner, as for instance by a bracket or shelf 31 having openings through which bottom flanges on said reservoirs project, as shown in the drawings, to keep them in proper alinement. The lower end of each reservoir is also provided with a discharge cock 32 for draining off condensation, etc., and said cocks may be utilized for discharging more or less steam during the operation of the lubricating device.

Each tank or reservoir is supplied with lubricating oil through a filling opening 33 in its top, said opening being tightly closed during the operation of the lubricating device by means of a screw-plug 34.

The piston 26 working in each reservoir to force the oil to the parts or bearings to be lubricated is provided with a hollow piston-rod 35 extending upward therefrom through the body of lubricating oil and through a stuffing-box 36 in the top of said reservoir, and at the upper end of this piston-rod there is a valve 37 communicating with a steam-whistle 40, the valve having a lever 38 with an arm 39 projecting at right angles from the outer end thereof to coöperate with the handle 24 of the valve 23 in the feed-pipe 16. As will be noted, the valve 23 is so located that its operating-handle 24 will be in the path of the arm 39 on the lever 38 of the valve 37 carried by the piston-rod, whereby when the piston 26 is forced upward to near the top of the reservoir the said arm 39 will strike the aforesaid handle 24 to automatically operate the valves 37 and 23 respectively, the former being opened to sound the whistle and thereby indicate that the supply of lubricating oil in the reservoir needs replenishing, and the last mentioned valve being closed to prevent back pressure in the feed-pipe 16 during the operation of supplying oil to the reservoir through the filling opening 33. In practice the valves 37 and 23 are regulated so that the valve 37 will open before the valve 23 is closed. Of course other means may be employed for opening the valve 37 when the piston reaches the upper end of the reservoir, but by the arrangement shown and described the movement of the piston and its piston-rod also serves to close the cut-off in the oil feed pipe so that this important operation will not be neglected preliminary to replenishing the reservoir.

Any suitable lubricating oil may be used in connection with the lubricating device, according to preference, or the character of bearings to be lubricated, and the several reservoirs may contain different kinds of oils. By having the lubricating oil above the piston and employing steam to force said piston upward the oil will be kept warm and flow into the feed pipes more freely, especially as the hollow piston-rod passes up through the body of the oil and gives an increased heat radiating surface.

The operation of my improved force-feed lubricating device will be readily understood from the foregoing description in connection with the accompanying drawings, for the oil in all of the tanks or reservoirs will be forced through their respective feed pipes 16 to the engine, machine, or bearing parts to be lubricated by the upward movement of the pistons actuated by steam admitted into the lower ends of said tanks or reservoirs, and the feed of the lubricating oil apparent through the sight-feed device can be regulated by the needle-valve. When the supply of lubricating oil is nearly exhausted in any one of the reservoirs the piston will be at the upper end of said reservoir and consequently the valve carried by the piston-rod will be first operated by the handle of the valve on the feed pipe to sound the whistle valve and then the last mentioned valve will be closed so that this particular reservoir may be refilled, and after the operation of refilling the reservoir is completed the valve in the feed pipe is opened.

I claim:—

1. A force-feed lubricating device comprising a receptacle to contain the oil and having a feed-pipe extending therefrom, a piston working in the receptacle to confine the oil under pressure at one side of said piston, means for admitting fluid pressure into the receptacle at the other side of said piston, a hollow piston-rod communicating with the fluid-pressure chamber and extending from the piston through one end of the receptacle, a valve at the outer end of the piston communicating with an alarm device, and means for operating the valve by the movement of the piston.

2. A force-feed lubricating device comprising a receptacle to contain the oil and having a feed-pipe extending therefrom, a piston working in the receptacle to confine the oil under pressure at one side of said piston, means for admitting steam into the receptacle at the other side of the piston, a hollow piston-rod communicating with the steam-chamber and extending from the piston through the body of oil and one end of the receptacle, a valve at the outer end of the piston-rod communicating with an alarm device, and means for operating the valve by the movement of the piston.

3. A force-feed lubricating device comprising a receptacle to contain the oil and having a feed-pipe extending therefrom, a piston working in the receptacle to confine the oil under pressure at one side of said piston, means for admitting steam into the receptacle at the other side of the piston, a hollow piston-rod communicating with the steam-chamber and extending through the body of oil and one end of the receptacle, a valve at the outer end of the piston-rod communicating with an alarm device, and an operating-arm for said valve; together with a cut-off valve in the oil feed pipe, and an operating arm for the last mentioned valve located in the path of the operating arm of the valve at the upper end of the piston-rod, substantially as shown and for the purpose set forth.

4. A force-feed lubricating device comprising a receptacle to contain the oil and having a feed-pipe extending therefrom, a piston working in the receptacle to contain the oil at one side of said piston under pressure, means for admitting steam into the receptacle at the other side of the piston, a hollow piston-rod communicating with the steam-chamber and extending through the body of oil and one end of the receptacle, a valve at the outer end of the piston communicating with an alarm device, and an operating arm for said valve projecting to one side thereof; together with a needle-valve and sight-feed in the feed pipe adjoining the receptacle, a cut-off valve in said feed pipe beyond the needle-valve and sight-feed, and an operating-arm for the cut-off valve having an upturned end in the path of the operating arm for the valve at the outer end of the piston-rod, substantially as shown and for the purpose set forth.

In testimony whereof I hereunto affix my signature.

CHARLES CALHOUN.